United States Patent [19]
Weiler et al.

[11] 3,827,846
[45] Aug. 6, 1974

[54] APPARATUS FOR MAKING CURED TIRE TREAD STRIP

[76] Inventors: Herold J. Weiler, 1239 Thayer Dr., Asheboro, N.C. 27203; John E. Weiler, 4808 Balcones Dr., Austin, Tex. 78731

[22] Filed: Aug. 22, 1972

[21] Appl. No.: 282,850

[52] U.S. Cl.................. 425/371, 425/451, 425/89
[51] Int. Cl.......................... B29h 5/02, B29h 3/06
[58] Field of Search........ 425/371, 395, 450 C, 451, 425/453, 346, 347, 233, 383, 446

[56] References Cited
UNITED STATES PATENTS

| | | | |
|---|---|---|---|
| 1,406,856 | 2/1922 | Hatch | 425/451 X |
| 1,603,140 | 10/1926 | Muller | 425/371 |
| 2,176,945 | 10/1939 | Roberts | 425/451 X |
| 2,288,611 | 7/1942 | DeWyk | 425/451 X |
| 2,496,016 | 1/1950 | Nelson | 425/253 X |
| 2,533,335 | 12/1950 | Wallace | 425/451 X |
| 2,602,960 | 7/1952 | Fischbein | 425/89 X |

*Primary Examiner*—J. Spencer Overholser
*Assistant Examiner*—David S. Safran
*Attorney, Agent, or Firm*—Pravel, Wilson & Matthews

[57] ABSTRACT

Apparatus for making cured tire tread in strip form continuously, wherein uncured rubber is introduced between endless track molding units having means therewith for confining and molding the rubber in a strip with a predetermined tire tread pattern on one side of the strip, and wherein the uncured rubber is cured while being molded between said molding units and moved therewith to discharge in cured form as a strip from the apparatus. One of the molding units includes an endless flexible band which cooperates with molds carried by the other molding unit, and preferably having the molds carried by trays which are separable from the rest of the apparatus. The separable trays and molds may be moved in a sequence through the longitudinal reach between the molding units during the molding and curing of the tire tread, then discharged therefrom, and then returned to the point of entry into such reach for re-use, so that a continuous supply of such trays and molds is always present between the molding units. The molding units are automatically locked together in the area thereof in which the molding and curing take place, so that the pressure of the rubber in the molds is controlled and the rubber is confined conforming to the molds during curing.

2 Claims, 9 Drawing Figures

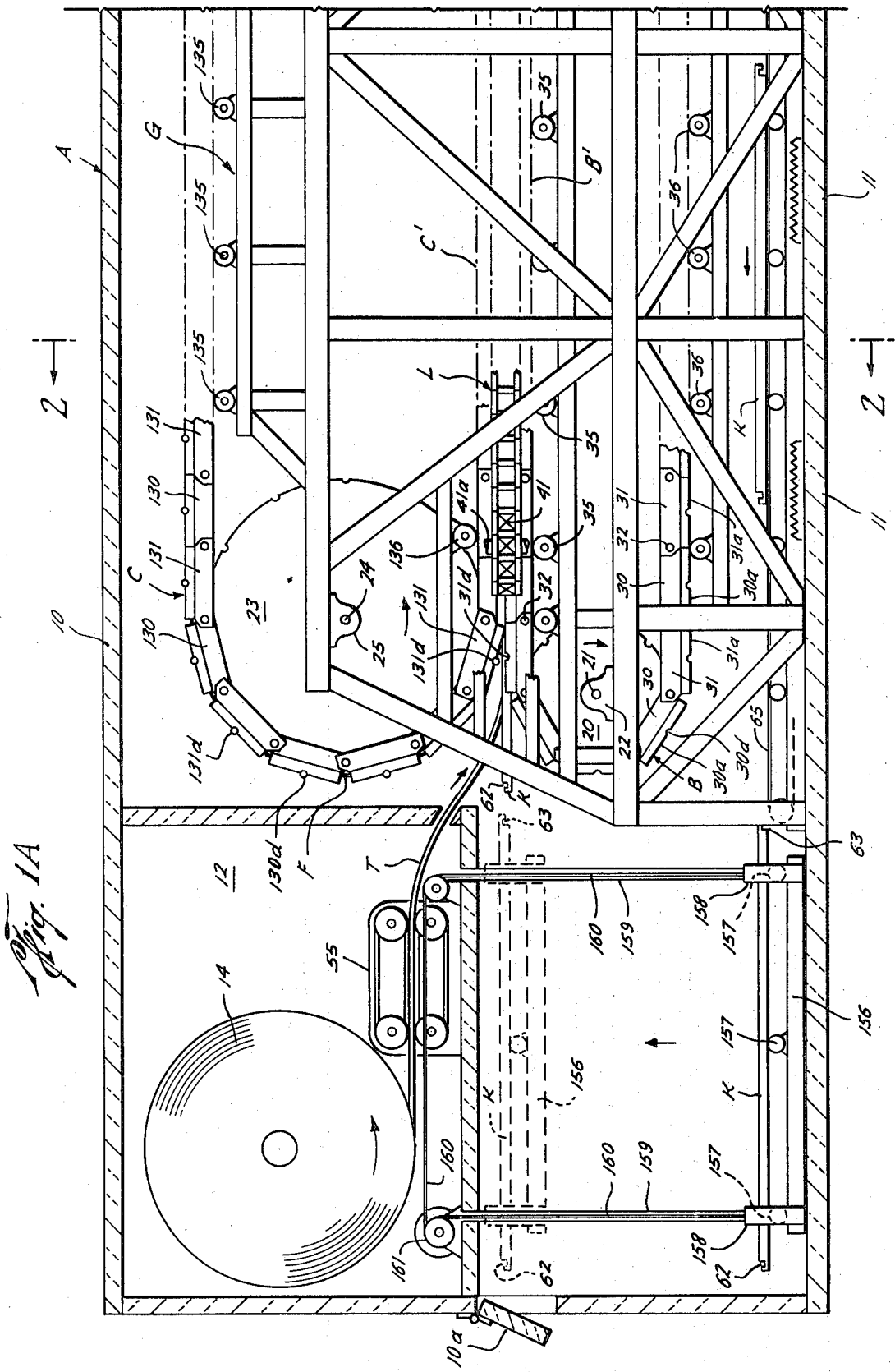

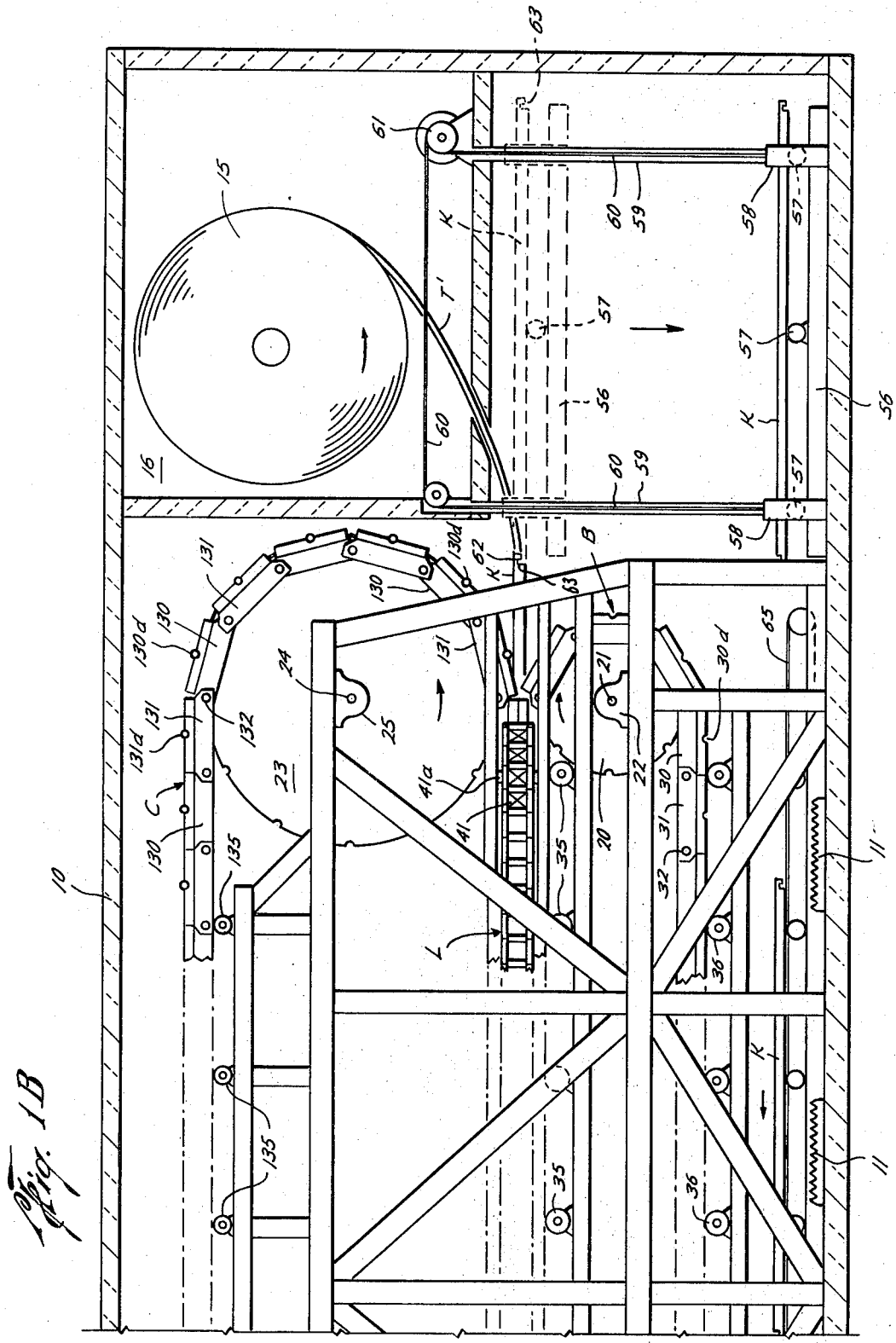

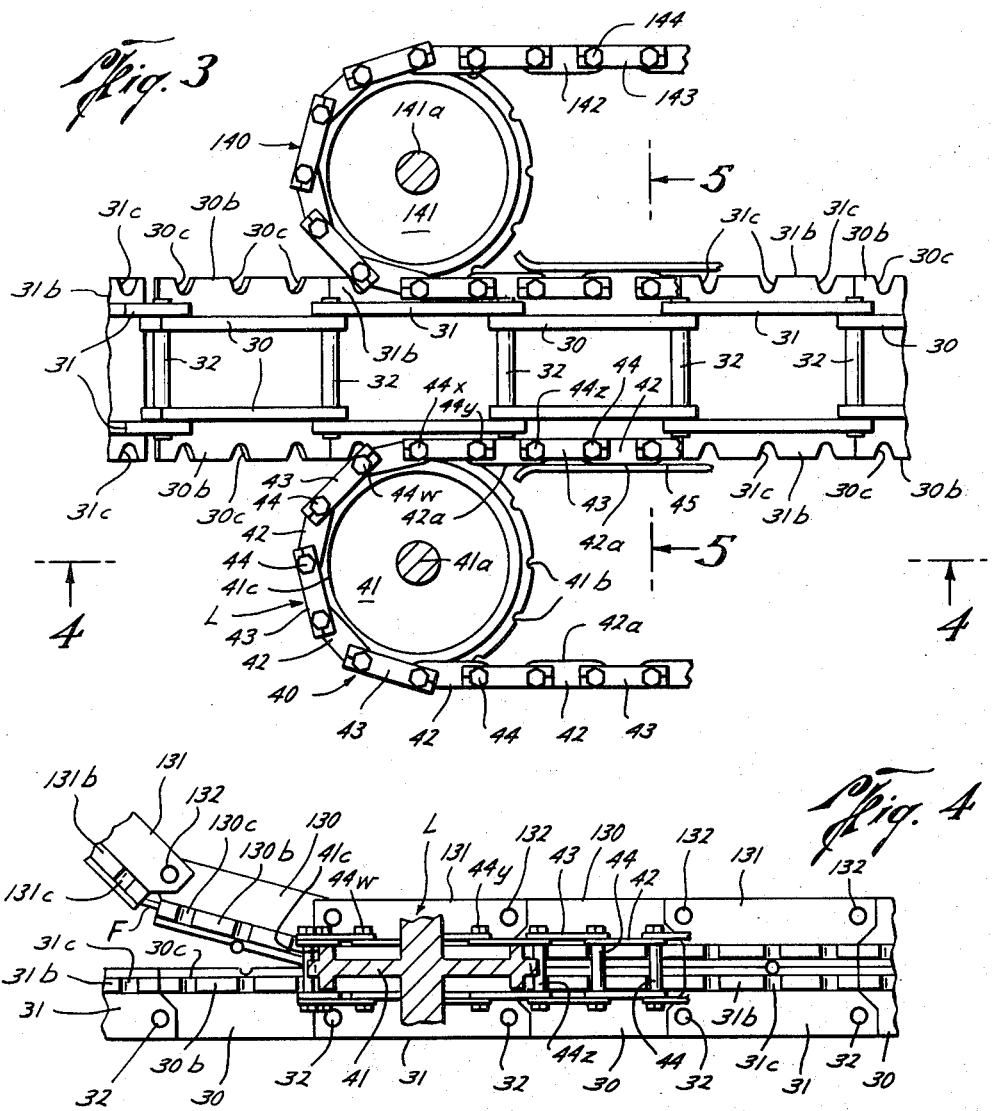
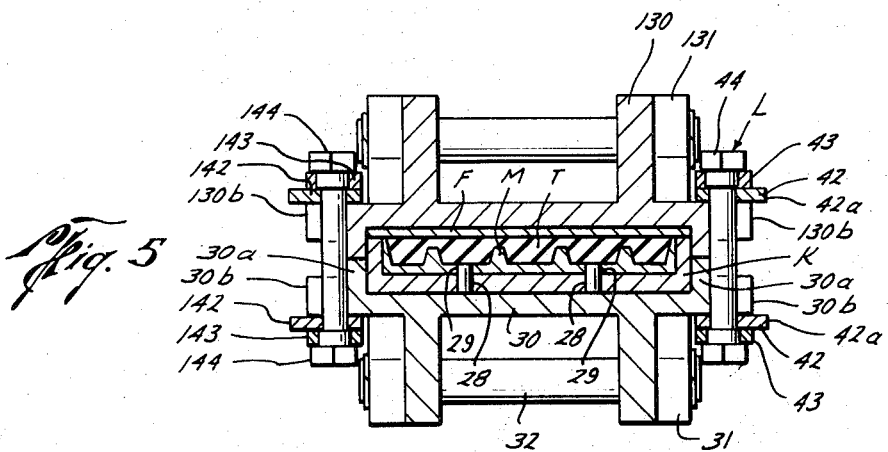

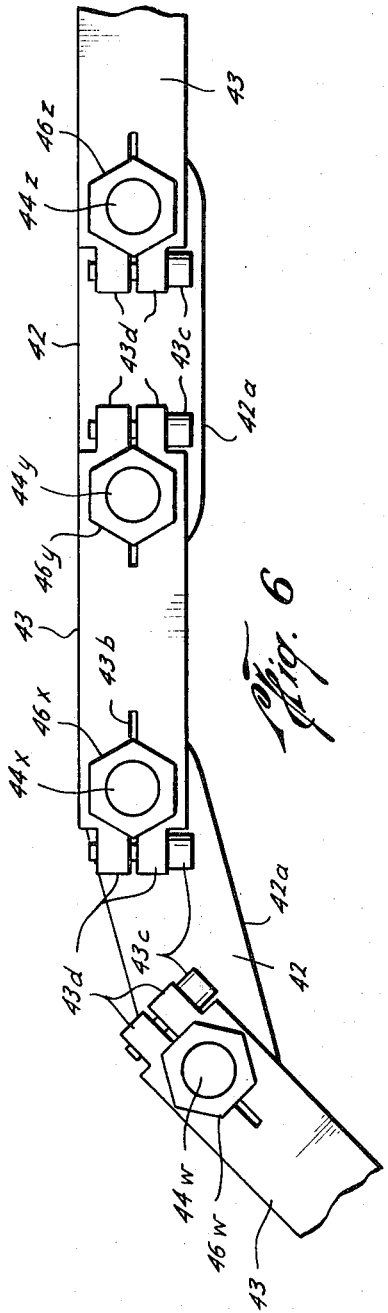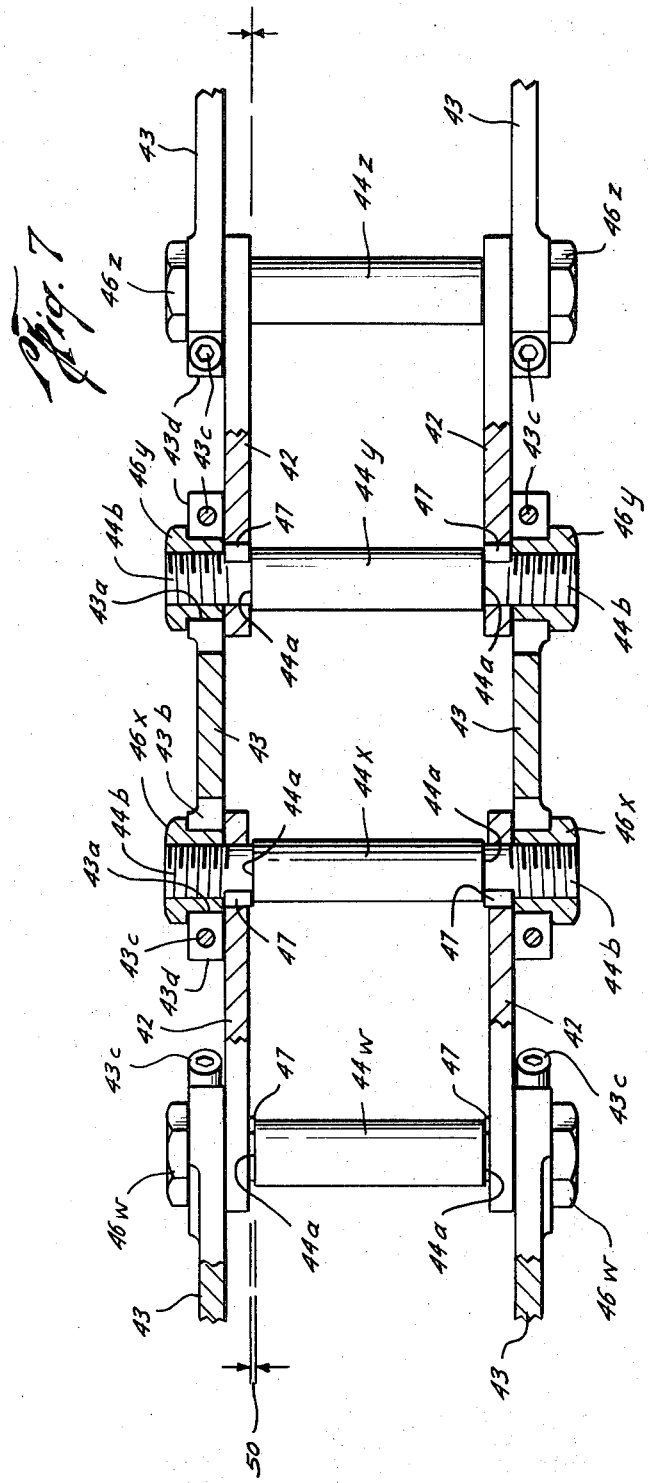

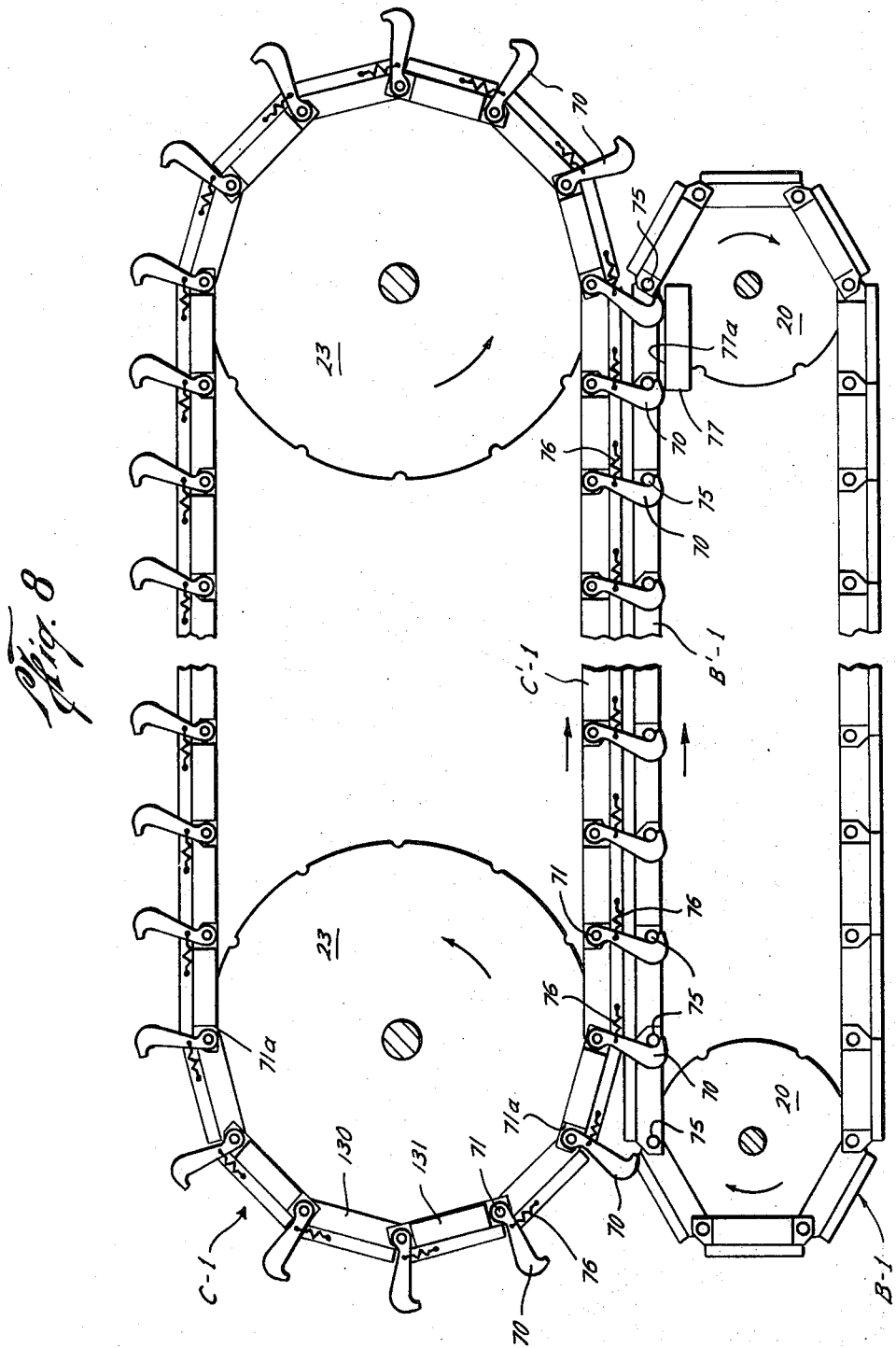

3,827,846

1

APPARATUS FOR MAKING CURED TIRE TREAD STRIP

BACKGROUND OF THE INVENTION

The field of this invention is apparatus for making cured tire tread which is adapted to be subsequently cemented or otherwise secured to a tire carcass, normally as a retread.

In the past, it was conventional practice to place "camel-back" or uncured rubber around a used tire carcass in a mold and then subject the rubber and carcass to high temperatures, for example, about 350°F., to effect a molding of the tread from the uncured rubber, a curing of such rubber, and a bonding of the tread rubber to the carcass. Such procedure suffered from the disadvantage that the reinforcing cords in the carcass were weakened by the high temperature, resulting in premature carcass failures.

More recently, a process has been developed wherein the tire tread is separately molded and pre-cured prior to cementing or otherwise securing to the used tire carcass. Such procedure thus obviated the necessity to subject the tire carcass to high temperatures which would damage the reinforcing cords therein. However, so far as is known, prior to the present invention such manufacture of the tire tread has always been in huge stationary presses with a limited capacity and operating intermittently to form the cured tire tread so that production has been restricted and time delays have been excessive due to the manual handling and waiting periods involved for the curing of the tire tread.

SUMMARY OF THE INVENTION

The present invention relates to an apparatus for making cured tire tread strip continuously whereby production of such strip can be continued so long as the apparatus is operated and no waiting periods or time delays are involved for the curing of the rubber since the rubber is continuously fed and discharged from the molds and curing section.

The apparatus of this invention has two endless track molding units with opposed longitudinal reaches thereof disposed for receiving uncured rubber, molding it and discharging cured rubber therefrom. A mold or molds are carried by one of the molding units for continuously receiving the uncured rubber and for cooperating with a flexible band on the other unit for molding the rubber with a tire tread pattern on one side as the rubber passes longitudinally between the reaches of the molding units, where curing also takes place so that a continuous cured tire tread strip is discharged from the molding units. Separable trays and molds are preferably used. The molding units are automatically locked together at the reaches thereof to confine the rubber in the molds during molding and curing.

BRIEF DESCRIPTION OF THE DRAWINGS

FIGS. 1A and 1B are elevations of the preferred form of the apparatus of this invention with FIG. 1A showing the left-hand portion thereof and with FIG. 1B showing the right-hand portion of such apparatus;

FIG. 3 is a view taken on line 3—3 of FIG. 2;

FIG. 4 is a view taken on line 4—4 of FIG. 3;

FIG. 5 is a view taken on line 5—5 of FIG. 3;

FIG. 6 is a partial enlarged view of a portion of the locking mechanism illustrated in FIG. 3;

FIG. 7 is a view, partly in section, further illustrating the locking mechanism of FIGS. 3–6; and FIG. 8 is an elevation illustrating a modified form of the apparatus of this invention.

DESCRIPTION OF THE PREFERRED EMBODIMENTS

Figure 2:
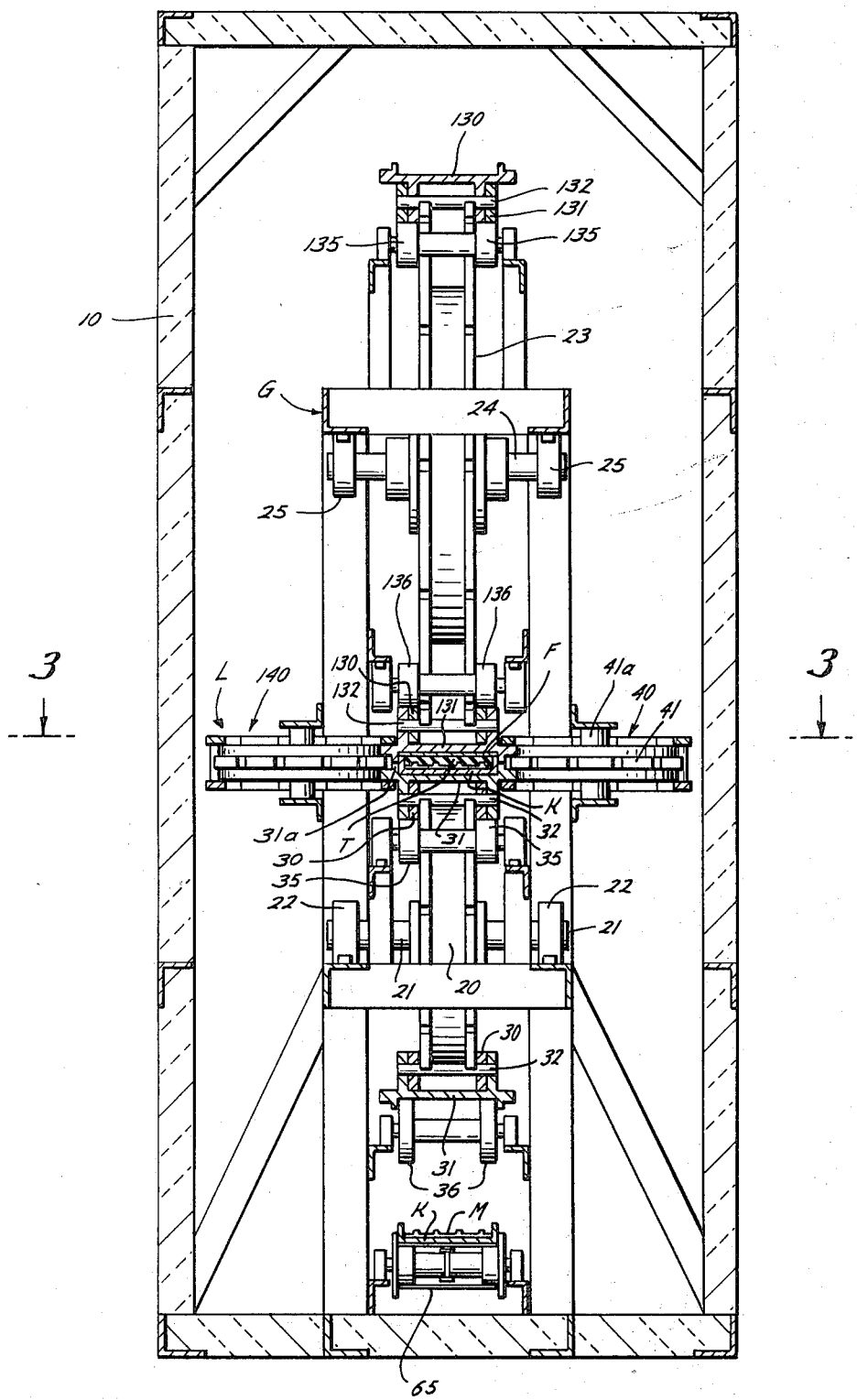
FIG. 2 is a vertical sectional view taken on line 2—2 of FIG. 1A.

In the drawings, the letter A designates generally the apparatus of this invention which is adapted to receive "camel back" or uncured rubber or similar tire material T at one end thereof and continuously manufacture tire tread in strip form and discharge same as indicated at T' (FIG. 1B) for subsequent application to new or used tire carcasses. Broadly, the apparatus A includes a first endless track molding unit B and a second endless track molding unit C which are disposed so that each has a longitudinal reach B' and C' respectively, which reaches are parallel to each other and are adapted to receive the tire material T therebetween. The first molding unit B is adapted to receive tire tread molds M and preferably a plurality of separable tire mold trays K which move between the longitudinal reaches B' and C' of the units B and C, respectively, as will be more evident hereinafter. An endless flexible band F is carried by the second molding unit C and it cooperates with the mold trays K and the mold or molds M for confining the tire material T while it is being molded and cured during its passage between the longitudinal reaches B' and C', as explained in detail hereinafter. Because the tire material T is normally uncured rubber which expands when it is heated for curing, locking means L, the details of which will be hereinafter explained, are employed for holding the sections of the molding units B and C together as they pass through said reaches B' and C'. As will be further explained, suitable heating is provided so that the tire material T is molded and cured continuously using the apparatus A of this invention.

Considering the invention more in detail, the apparatus A preferably includes an insulated housing 10 which surrounds the rest of the apparatus and which serves to confine the heat generated by any suitable heating units such as the electrical heating units 11 shown in FIGS. 1A and 1B. The heat generated in the housing 10 is generally in the neighborhood of 350°. A separate chamber 12 is provided within the housing 10, or separate therefrom for holding a supply reel 14 having uncured or camel-back rubber or similar tire material T wound thereon. The chamber 12 is insulated from housing 10, and, if necessary, cooled so that it is not heated to prevent premature curing of the rubber on the supply reel 14. Normally, the chamber 12 is at ambient temperature from 50° to 100°F., although this temperature may vary so long as the heat is not sufficient to cure the rubber on the supply reel 14 prematurely. Similarly, a take-up reel 15 is provided in a separate chamber 16 which is likewise preferably at ambient temperature of from 50° to 100°F. and it is thus either insulated or separate from the chamber 10 to prevent excessive curing of the rubber or other tire material T which has already been formed into the tire tread.

The two molding units B and C are preferably supported on any suitable type of structural framework generally designated by the letter G. The lower molding unit B has a pair of sprockets 20 (FIGS. 1A and 1B) which are supported on suitable shafts 21 which in turn are mounted on suitable pillow block bearings 22, each of which is mounted on the frame G.

The upper molding unit C has larger sprockets 23, each of which is supported on a shaft 24 which extends through pillow block bearings 25 attached to the framework G (FIGS. 1A, 1B and 2). An electric motor (not shown) and variable speed transmission of conventional construction are preferably connected to the shaft 24 of the discharge sprocket 23 (FIG. 1B) for providing the driving power for the two units B and C, although it will be appreciated that any suitable power means for such units B and C may be used.

The endless track molding units B and C are constructed in the same or a similar manner and of the same or similar components as can be seen in FIGS. 1A–5. Thus, the lower molding unit B is composed of a plurality of sections or links 30 which are alternately disposed with respect to links or sections 31 and they are interconnected by connecting pins 32 to form an endless chain of such links or sections 30, 31 disposed around the two sprockets 20. Portions of the apparatus have been removed in FIGS. 1A, 1B and 3 to more clearly illustrate such construction. The links or sections 30 and 31 are each formed identically with respect to upstanding side flanges 30a (FIG. 5) and 31a (FIG. 2). Thus, the side flanges 30a and 31a are all in longitudinal alignment with each other as the respective links 30 and 31 pass through the longitudinal reach B'. They each define a mold cavity suitable for receiving the mold trays K and the molds M therein and between such flanges 30a and 31a. Each mold M is releasably coupled to a mold tray K by pins 28 in the tray K which extend into holes 29 in the mold M. The links or sections 30 have laterally extending lips 30b with vertical notches 30c therein, the purpose of which will be hereinafter explained. Similarly, the links or sections 31 have laterally extending lips 31b with vertically extending notches 31c therein. It is to be noted that the lips 30b and 31b extend from both sides of the links or sections 30 and 31, respectively (FIG. 3).

The links or sections on the upper molding unit C are identically constructed as illustrated in the drawings and are numbered with the same numerals and letters except that the prefix 1 is used for the molding unit C. Thus, the links or sections 130 correspond with the links or sections 30, and the links or sections 131 correspond with the links or sections 31. They are connected together by connecting pins 132 in the same manner as the pins 32 connect the links 30 and 31 as shown in FIG. 3. Also, they have laterally extending lips 130b and 131b with corresponding notches 130c and 131c.

For interengaging the links or sections of the molding units B and C as they enter the molding portion of their operation where the two longitudinal reaches B' and C' are disposed, laterally extending rods 130d and 131d on the links 130 and 131, respectively, are provided for fitting into notches 30d and 31d on the track links or sections 30 and 31, respectively (FIGS. 1A and 1B). The interfitting of the rods 130d and 131d with the notches 30d and 31d prevents any relative longitudinal shifting between the links or sections 30,31 and 130,131 during the molding process as such units are passing through the area of the longitudinal reaches B' and C'.

The links or sections 30,31 of the molding unit B are preferably supported between the sprockets 20 by supporting rollers 35 and 36 which are suitably mounted on the frame G. Similarly, the links or sections 130,131 of the molding unit C are supported by rollers 135 which are likewise suitably mounted on a portion of the framework G. One or more hold-down rollers 136 may also be employed in the lower portion of the endless track unit C to prevent a separation of the links 130,131 from the lower links 30,31 at the beginning of the molding operation. Such roller or rollers 136 are suitably supported on a portion of the framework G or any other suitable support means.

The preferred locking means L which is illustrated in particular in FIGS. 2–5, and which is only partially shown in FIGS. 1A and 1B, is adapted to engage the lips 30b and 130b on both sides of the two units B and C as they enter their substantially parallel longitudinal reaches B' and C', and locking means L continues to hold such lips 30b and 130b together throughout their travel through the longitudinal reaches B' and C'. The locking engagement of the locking means L with such lips 30b and 130b is released at the exit end of such reaches B' and C' (FIG. 1B).

The preferred locking means L shown in FIGS. 1A–7 includes a pair of endless link assemblies 40 and 140 disposed on opposite sides of the two units B and C. Such units 40 and 140 are identical and therefore, a detailed explanation will be made with respect to the locking assembly or unit 40 only and the same numerals will be used for the locking assembly or unit 140 except that the numeral "1" will be used as a prefix for the numerals so that the corresponding parts can be readily seen in the drawings.

Thus, the locking assembly or unit 40 has a pair of sprockets or guide wheels 41, with the left-hand sprocket 41 being disposed at the entrance to the longitudinal reaches B' and C' in proximity to the point at which the links or sections 30,31 and 130,131 of the two units B and C converge to begin their substantially parallel travel with respect to each other. The other sprocket 41 at the right-hand end of the locking assembly or unit 40 is disposed at the right-hand end of the apparatus A in proximity to the discharge or exit portion of the longitudinal reaches B' and C' (FIG. 1B) where the links or sections 30, 31 and 130, 131 diverge for the discharge of the molded tire tread strip therefrom, as will be more evident hereinafter.

Each sprocket 41 is rotatably mounted on a suitable central shaft 41a which is supported by any suitable means on the framework G (FIG. 2). The endless portion of the locking assembly or unit 40 is composed of alternate locking plates or links 42 which are joined together by connecting links 43 and connecting pins 44. Such plates 42 and connecting links 43 are disposed above and below the laterally extending lips 30b and 130b (FIGS. 4 and 5). The pins 44 are adapted to fit into sprocket notches 41b on each of the two sprockets 41. Also, as the pins 44 move into proximity to the lips 30b and 130b, such pins 44 are adapted to enter the notches 30c and 130c as well as notches 31c and 131c of the molding units B and C (FIGS. 3 and 4) so that the movements of the links 42 and 43 are coordinated with the movements of the endless track molding units B and C. A separate drive means for the endless locking unit or assembly 40 is thus not utilized or needed. Preferably, the locking plates 42 are disposed so that they contact the lips 30b and 130b (FIGS. 4 and 5). Also, the links 42 preferably are formed with an extended surface 42a (FIG. 3) which engages a guide bar 45 so as to control the position of the links 42 when they are locking the lips 30b and 130b together. Also, each extended surface 42a engages an annular surface 41c (FIGS. 3 and 4) on each sprocket 41 for supporting the chain links 42 and 43 of the unit B so that such links are in position to straddle the lips 30b, 130b and 31b, 131b. Such bar 45 preferably extends for substantially the whole length of the longitudinal reaches B' and C'.

In FIGS. 6 and 7, a portion of the locking or link assembly 40 is illustrated in greater detail to facilitate an understanding of the preferred detailed functioning of the locking means L. Four of the connecting pins 44 are shown in FIG. 7 in the position as they are moving from the sprocket 41 into their substantially parallel path where the pins 44 are in the notches 30c, 130c and 31c, 131c of the molding units B and C. For ease of reference, the connecting pins 44 in FIGS. 6 and 7 are identified as 44w, 44x, 44y and 44z and the same markings are used in FIG. 3 to correlate the figures of the drawings.

As illustrated in FIGS. 6 and 7, the connecting pins 44w–z are threaded on each end and they have threaded nuts 46w–z, respectively on each of such threaded ends. Each of the connecting links 43 is formed with an opening 43a for receiving one of the nuts at each end thereof. Each of the openings 43a has a slot or split 43b running longitudinally therethrough for a portion of the length of each link 43 and in proximity to the nut 46 with which it is to be connected. An adjustable clamping screw 43c is threaded into a threaded opening in end projections 43d on each side of the slot 43b for providing a frictional clamp at each end of each connecting link 43 to connect each end thereof to one of the nuts 46. It will be appreciated that threads are provided in only the projection 43d furtherest from the head on the clamping screw 43c so that upon a rotation of the clamping screw 43c, the space 43b may be reduced for the gripping action on the nut 46 therewith.

The locking or clamping plates 42 are mounted on the connecting pins 44 for a limited vertical travel relative thereto by an amount indicated at 50 in FIG. 7. Such movement of each of the locking plates 42 is accomplished by mounting each plate 42 on a reduced diameter portion of the connecting pins 44 as best seen in FIG. 7. Thus, each of the pins 44 is provided with a shoulder 44a which is of a larger diameter than the threaded portion 44b therewith. Each locking plate 42 is suitably locked or keyed to the connecting pins 44 at each end thereof by a key 47 or any other suitable slidable connecting means which prevents relative rotation between the plate 42 and the pins 44 while permitting the limited relative longitudinal movement of the plate 42 for the distance 50 with respect to the pins 44.

In the portion of the locking assembly or unit 40 illustrated in FIGS. 6 and 7, the upper threads 44b on the connecting pin 44x are left-hand threads while the lower threads 44b on such pin 44x are right-hand threads. The threads 44b on the connecting pin 44y are right-hand threads while the lower threads 44b on such pin 44y are left-hand threads. The same arrangement of threads applies to the other connecting pins in alternate arrangement. Thus, the threads on the connecting pin 44w at its upper end are right-hand threads and the threads at its lower end are left-hand threads. The threads at the upper end of the pin 44z are left-hand threads and the threads at its lower end are right-hand threads. Therefore, as the locking assembly 40 travels in its endless path, the plates 42 and 43 while they are still on the sprocket 41 are spaced apart a greater distance than they are when they move into the locking portion of their travel through the longitudinal reaches B' and C' of the molding units B and C. Thus, viewing FIGS. 6 and 7, as the left-hand locking plates 42 are still moving off of the sprocket 41, they are still spaced apart a greater distance than the plates 42 which are connected to the pins 44y and 44z. Such distance is indicated at 50 and this would be provided on each end of the pins 44w and 44z while the plates 42 are still on the sprocket 41 and are leaving same. As the connecting pin 44x moves to the position shown in FIG. 6, it is essentially just entering the straight portion of its travel and since the nut 46x at the upper end of the connecting pin 44x is prevented from rotating by reason of its being held by the link 43, as previously explained, the clockwise movement of the upper link 42 from the position shown in FIG. 6 as it travels towards the straight portion causes a rotation of the pin 44x in a clockwise direction relative to the upper nut 46x. Since the threads 44b at the upper end of the pin 44x are left-hand threads, this causes the nut 46x to move downwardly relative to the pin 44x to force the plate 42 downwardly towards the shoulder 44a. At the same time, the lower plate 42 is likewise moving in such clockwise direction and therefore the nut 46x on the right-hand threads 44b at the lower end of the pin 44x also tightens and moves such lower plate 42 upwardly towards the shoulder 44a at the lower end of the pin 44x, whereby the plates 42 force the lips 30b, 130b and 31b, 131b together.

As the next links 43 which are mounted on the connecting pin 44w move around and begin to move somewhat clockwise as they feed from the upper end of the sprocket 41, a similar action takes place to that described heretofore with respect to the plates 42. Thus, the nuts 46w are rotated while the pin 44w is essentially prevented from rotating by reason of its keyed connection to the plates 42 and since the upper threads on the pin 44w are right-hand threads and the lower threads on the pin 44w are left-hand threads, the nuts 46w tighten and move towards each other to move the plates 42 inwardly towards each other so as to take up at least a portion of the spaces 50 at each end of the pin 44w. Such action occurs after the plates 42 are positioned on each side of the lips 30b, 130b and 31b, 131b so that such plates 42 force such lips together to thereby increase the gripping or clamping action on such lips while the locking unit travels in the longitudinal reaches B' and C'.

When the plates 42 and the links 43 reach the exit end (FIG. 1B), the reverse action takes place so that the nuts 46 are unthreaded for the limited amount necessary to permit the plates 42 to move apart and again provide the distance 50 from the shoulders 44a to thereby facilitate the release of the lips which have been clamped by the plates 42.

As previously noted, the uncured rubber or tire material T is provided on a supply reel 14 which is rotatably mounted in the chamber 12. The feeding of such tire material T to the molding units B and C may be accomplished with any suitable apparatus which is schematically indicated at 55 in FIG. 1A and consists of a pair of endless conveyor belts which are actuated by any suitable prime mover preferably having a conventional variable speed control so that the amount of uncured rubber fed to the mold cavity may be regulated within close limits as desired. Preliminary heating of the tire material T may be accomplished by a microwave or other type heater (not shown) of any conventional construction to soften the rubber prior to its entry into the molding units B and C.

As previously explained, the mold trays K are preferably separable and are introduced at the entrance to the longitudinal reaches B' and C' as shown in FIG. 1A and are then discharged at the exit end of such reaches B' and C' (FIG. 1B). Any suitable apparatus may be used for handling such trays K to collect them at the discharge end of the apparatus and return them to the entrance end thereof. For example, as shown in FIG. 1B, a very simple tray receiving and lowering apparatus is provided which includes a lowering platform 56 having rollers 57 thereon and which is connected to tubular slides 58 that slide up and down on pipes or guides 59. A pair of cables 60 extend down adjacent the pipes 59 and are attached to the platform 56 and such cables run to a winch or reel 61 which is coupled to a motor equipped with suitable controls for moving and positioning the platform as desired. As shown by the dash lines, a tray K is pushed out together with the mold M therein to the position shown in FIG. 1B by the tray K which is at the point of exit as shown in such figure. The platform 56 is then lowered, releasing the notches 62 at the left-hand end of the tray K from the notches 63 in the tray K which is still in the apparatus. The lowering of the platform 56 thus releases the notch connection and lowers the tray K thereon to the solid line position of FIG. 1B, which places the mold tray K in alignment with a suitably controlled conveyor 65. The tray K is then automatically or manually moved from the solid line position of FIG. 1B to the conveyor 65 and then it is transported to the left as viewed in FIGS. 1B and 1A until it reaches a similar platform 156 at the left-hand end of the apparatus (FIG. 1A). The platform 156 has rollers 157 thereon, and tubular guides 158 connected thereto which slide on tubular guides 159. Cables 160 are operated by a suitable winch 161 or other power reel means to raise and lower the platform 156.

Thus, the tray K is elevated by the platform 156 when the winch 161 is operated to wind up the cable 160. The platform 156 is moved to the dotted line position of FIG. 1A so as to line up the tray K shown in dotted lines with the space between the reaches B' and C' of the molding units B and C. The notch 63 at the right-hand end of the tray K on the platform 156 is then connected to the notch 62 on the preceding tray K which is already in the space between the reaches B' and C' as shown in FIG. 1A by a manual manipulation through a suitable access opening such as the access opening 10a or by automatic powered movement of the tray. Thus, the trays are successively pulled into the reaches B' and C' by reason of their notched interconnections of the notches 62,63 and the flexible band F moves into position and forms the upper portion of the mold as best seen in FIG. 5. The tire material T is simultaneously fed into the area between the flexible band F and the mold M at the entrance to the longitudinal reaches B' and C' so that a continuous molding is accomplished using the separable molds K.

The operation of the apparatus of FIGS. 1–7 is believed evident from the foregoing description. Briefly, the tire material T is fed from a suitable source of supply such as the supply reel 14, preferably using feeding means 55 disposed in the chamber 12 which is at ambient temperature. The mold trays K with the molds M coupled therewith by the pins 28 in the holes 29 are fed simultaneously into the entrance to the area between the substantially parallel reaches B' and C'. It is to be noted that the trays K fit into the mold cavaties of the link sections 30 and 31 of the mold unit B.

The locking means L includes the two locking units 40 and 141, wherein the units are identical except that they move in opposite directions as best seen in FIG. 3. Such locking means L serves to hold the lips 30b, 130b and 31b, 131b together as previously explained so that as the rubber tends to expand while it is heated in the housing 10 to about 350°F., the sections of the units B and C remain together with the side flanges of the links 30, 130 and 31, 131 in abutment as shown in FIG. 5. The confinement of the rubber against its tendency to expand when heated causes a large build-up of pressure within the rubber during the curing phase, and results in a denser, tougher rubber tread product than would be obtained without such confinement.

The cured and molded tire tread strip T' is discharged from the right-hand end of the mold units B and C and is wound upon a reel 15 or other suitable storage means.

In FIG. 8, a modification of the apparatus of FIGS. 1–7 is illustrated, wherein the molding units B–1 and C–1 are only partially illustrated since they may be identical to the molding units B and C of FIGS. 1A and 1B, except for the locking means L. The locking means L is omitted from the form of the apparatus shown in FIG. 8, and instead, a modified locking means is employed which includes a plurality of pivoted locking hooks 70 which are pivoted at 71. For ease of reference, the same numerals are used for corresponding parts of the molding units B–1 and C–1 as are used for the molding units B and C.

The pivoted hooks 70 have a limited amount of pivotal movement, the extend of which is controlled by any suitable stops such as wall surfaces 71a so that the hooks 70 are in position for engaging their hook portions with laterally extending pins 75 carried by the unit B–1. It will be understood that hooks 70 may be provided on both lateral sides of the molding unit C–1 and corresponding pins 75 may be provided for each of the hooks 70. The hooks 70 are normally urged into engagement with the pins 75 by a spring 76 connected with the upper track C–1. Thus, as the units C–1 and B–1 converge at their entrance ends at the left-hand part of FIG. 1, with the unit B–1 moving clockwise and with the unit C–1 moving counterclockwise, the hooks 70 swing downwardly and fit underneath to engage the appropriate pins 75 aligned therewith as seen in FIG. 8. The hooked engagement of the pins 75 by the hooks 70 continues as the units move through their longitudinal reaches C'–1, B'–1 where the endless track portions are substantially parallel to each other. As the hooks 70 reach the exit end of the apparatus at the right-hand end of FIG. 8, each of the hooks 70 contacts a release plate 77 to cause it to swing to the left as viewed in FIG. 8 and then to ride along the upper edge 77a of such plate 77 until the pin 75 has moved out of position so that contact therewith is no longer possible. Thereafter, the hooks 70 are thus in a released position and move with the unit C–1 in its endless path and do not connect again with pins 75 until they return to the entrance end at the left-hand portion of the apparatus of FIG. 8.

Such hooks 70 and the connecting pins 75 together serve as the modified locking means of FIG. 8 and they replace locking means L of FIGS. 1–7. Such hooks when connected with the pins 75 prevent a separation of the molding units in their travel through the longitudinal reaches B'–1 and C'–1 so that when the rubber expands during the curing, the portions of the endless track molding units in the reaches B'–1 and C'–1 do not separate.

It will be appreciated by those skilled in the art that the amount of pressure which is developed by the expansion of the rubber in the molds may be controlled by allowing some escape of rubber as "flash" between the abutting surfaces of the flex band F and the mold M and also through weep holes (not shown) in the molds M and the mold trays K.

It should be noted that the mold units C and C–1 are provided with the larger sprockets 23 as compared to the smaller sprockets 20 of the mold units B and B–1 so as to prevent inelastic bending and possible early breakage of the flexible band F. However, the invention is not limited to the units B and C having sprockets of different sizes as shown in the drawings.

It is to be noted that because of the use of separable mold trays K and separable molds M, the tread design or pattern may be changed conveniently and easily. The molds themselves may be readily cleaned or altered as desired.

Although the apparatus of this invention has been described herein primarily for manufacturing tire tread, it should be understood that other similar strip products such as industrial belting may be manufactured with the apparatus.

The foregoing disclosure and description of the invention are illustrative and explanatory thereof, and various changes in the size, shape, and materials as well as in the details of the illustrated construction may be made without departing from the spirit of the invention.

We claim:

1. An apparatus for molding and curing a continuous strip, comprising:
   a first endless track molding unit having a longitudinal reach;
   a second endless track molding unit having a longitudinal reach in opposed position to and substantially parallel to said reach of said first unit;
   molding means on said first unit movable therewith in the area of said longitudinal reach and between said units for cooperating with said second unit for molding material fed between said units in the area of said longitudinal reaches thereof;
   locking means for locking said molding units together in the area of said longitudinal reaches during molding;
   each of said units having a laterally extending lip with notches formed therein;
   said locking means including an endless chain having spaced locking links and connecting pins, wherein the locking links are adapted to engage opposed lips on said units as they move through the area of said longitudinal reaches to prevent separation of said lips in said area; and
   lock adjusting means for initially moving each pair of the spaced links towards each other for clamping engagement between said locking links and said lips therebetween.

2. The apparatus set forth in claim 1, wherein said lock adjusting means includes:
   means for reducing the clamping engagement of the locking links as they move away from said reaches.

* * * * *